(12) United States Patent
Choi

(10) Patent No.: US 6,409,864 B1
(45) Date of Patent: Jun. 25, 2002

(54) METHOD OF ASSEMBLY OF PLEATED FILTER WITH SPACER INSERT

(75) Inventor: Kyung-Ju Choi, Louisville, KY (US)

(73) Assignee: AAF International, Inc., Louisville, KY (US)

( * ) Notice: Subject to any disclaimer, the term of this patent is extended or adjusted under 35 U.S.C. 154(b) by 0 days.

(21) Appl. No.: 09/498,377

(22) Filed: Feb. 3, 2000

Related U.S. Application Data

(62) Division of application No. 09/100,985, filed on Jun. 22, 1998, now Pat. No. 6,045,597.

(51) Int. Cl.$^7$ ............................................. B01D 27/06
(52) U.S. Cl. .................... 156/207; 156/205; 156/309.9; 156/322
(58) Field of Search ........................ 55/483, 484, 497, 55/501, 527; 210/493.5, 494.3; 156/205, 210, 207, 208, 322, 309.9, 82, 497

(56) References Cited

U.S. PATENT DOCUMENTS

| | | | |
|---|---|---|---|
| 2,907,408 A | 10/1959 | Engle et al. .................. 183/71 |
| 3,344,590 A | 10/1967 | Smith et al. .................. 55/484 |
| 3,691,735 A | 9/1972 | Newmann ..................... 55/484 |
| 4,056,375 A | 11/1977 | Ringel et al. ................. 55/381 |
| 4,227,953 A | 10/1980 | Wasielewski ............... 156/227 |
| 4,874,517 A | 10/1989 | Esch ........................ 210/493.5 |
| 5,066,400 A | 11/1991 | Rocklitz et al. ......... 210/493.5 |
| 5,084,178 A | 1/1992 | Miller ..................... 210/493.5 |
| 5,273,563 A | 12/1993 | Pasch et al. .................. 55/493 |
| 5,273,564 A | 12/1993 | Hill ............................. 55/493 |
| 5,306,321 A | 4/1994 | Osendorf ..................... 55/487 |
| 5,389,175 A * | 2/1995 | Wenz ........................ 156/204 |
| 5,743,927 A | 4/1998 | Osendorf ..................... 55/497 |
| 5,744,036 A | 4/1998 | Choi ........................ 210/493.5 |
| 5,800,585 A | 9/1998 | Choi ........................... 55/483 |
| 5,888,262 A | 3/1999 | Kahler ........................ 55/497 |
| 6,203,592 B1 * | 3/2001 | Carawan ...................... 55/484 |

\* cited by examiner

*Primary Examiner*—Michael W. Ball
*Assistant Examiner*—Barbara J Musser
(74) *Attorney, Agent, or Firm*—Polster, Lieder, Woodruff & Lucchesi

(57) ABSTRACT

A pleat filter medium assembly and method of making the same wherein pleated fibrous filter medium forming troughs between opposed faces of adjacent filter medium pleats serve to include spacer inserts formed from intersecting sets of spaced strands of different cross-sectional thickness.

6 Claims, 3 Drawing Sheets

METHOD OF ASSEMBLY OF PLEATED FILTER WITH SPACER INSERT

This is a divisional of U.S. application Ser. No. 09/100,985 filed on Jun. 22, 1998, now U.S. Pat. No. 6,045,597.

BACKGROUND OF THE INVENTION

The present invention relates to a unique and novel pleated filter media arrangement and method of assembly and more particularly to a unique and novel pleated filter arrangement and assembly method which includes at least one sheet of pleated porous filter medium with unique pleat spacer inserts between adjacent pleats and a unique method of assembling the pleated filter medium with spacers therebetween.

Spacer structures between adjacent porous filter media pleats are generally well known in the fluid filtration art. These past structures include various arrangements for providing spacer inserts between sheets of pleated porous filter media, such as in U.S. patents: U.S. Pat. No. 3,344,590, issued Oct. 3, 1967 to T. R. Smith et al; U.S. Pat. No. 3,691,736, issued Sept. 19, 1972 to G. M. Neumann; U.S. Pat. No. 3,941,571, issued Mar. 2, 1976 to A. R. Getzin; U.S. Pat. No. 4,056,375, issued to W. Ringel et al on Nov. 1, 1977; U.S. Pat. No. 4,227,953, issued Oct. 14, 1980 to S. J. Wasielewski et al; U.S. Pat. No. 4,874,517, issued Oct. 17, 1989 to H. W. Esch; and, U.S. Pat. No. 5,084,178, issued Jan. 28, 1992. to J. D. Miller et al. Other prior art patents have relied upon displacements in the filter media itself rather than spacer inserts- such as can be seen in U.S. Pat. No. 5,066,400, issued on Nov. 19, 1991 to G. J. Rocklitz et al; U.S. Pat. No. 5,306,321, issued on Apr. 26, 1994 to R. J. Osendorf; and, U.S. Pat. No. 5,744,036, issued on Apr. 28, 1998 to Kyung-Ju Choi. Further, U.S. Pat. No. 5,800,585, issued Sep. 1, 1998 to Kyung-Ju Choi, teaches supporting pocket netting having sufficient stiffness and rigidity to support a preselected pocket weight per given unit area.

For the most part, the past spacing arrangements have been comparatively complex and expensive in manufacture of the several parts involved and in the assembly of such parts. Further, these past spaced arrangements have presented comparatively high resistances and concomitant pressure drops in the treated fluid stream along with reduced filtering areas in given units of space.

The present invention provides a unique and novel spacer insert arrangement for pleated filter media sheets which is economical and straightforward in manufacture and assembly, requiring a minimum of parts, allowing for a minimum of pressure drop across the filter media and optimizing the filtering surface in a given space, enhancing pleated filter media spacing and fluid stream flow therethrough. In addition, the present invention provides a unique method and apparatus which is straightforward and economical with a minimum of parts and a minimum of steps for assembling the novel filter arrangement.

Various other features of the present invention will become obvious to one skilled in the art upon reading the disclosure set forth herein.

BRIEF DESCRIPTION OF THE INVENTION

More particularly, the present invention provides a pleated filter arrangement for removing particulate matter from a fluid stream comprising; at least one sheet of porous filter medium having opposed faces and being pleated into a plurality of longitudinally extending spaced pleats of porous filter medium; a plurality of longitudinally extending, flow-through, screen-like inserts, each insert including a body portion sized to be inserted into nesting relation with and engaging between opposed faces of adjacent pleats of porous filter medium to separate the adjacent pleats, the body portion of the inserts including spaced strands of preselectively differing cross-sectional thicknesses with at least certain of which extend in transversely crossing relation and arranged to enhance pleated filter medium spacing and particulate carrying fluid stream flow therethrough. In addition, the present invention provides a unique method of forming a pleated filter comprising: passing a flat strip of filter medium of preselected width into a pleating zone to pleat the filter medium into adjacent pleats having opposed faces of preselected depth with troughs therebetween; passing the pleated filter medium from the pleating zone into a spacer zone to insert a screen-like spacer member having spaced strands into each of the troughs with the spaced strands having differing preselected cross-sections and positioned between opposed faces of adjacent pleats to maximize fluid flow therethrough; and passing the spacer inserted pleated filter medium from the spacer insert zone to a severing zone to separate unit spacer-inserted filter medium into preselected lengths.

It is to be understood that various changes can be made by one skilled in the art in one or more of the several parts and in one or more of the several steps of the inventive arrangement and method disclosed herein without departing from the scope or spirit of the present invention. For example, the geometry of each pleat and differing spacer strands can be varied, as can the materials employed, without departing from the inventive pleated filter arrangement and method of forming the same.

BRIEF DESCRIPTION OF THE DRAWINGS

Referring to the drawings which disclose one advantageous embodiment of the present invention and two modification thereto.

DETAILED DESCRIPTION OF THE DRAWINGS

Figure 1:
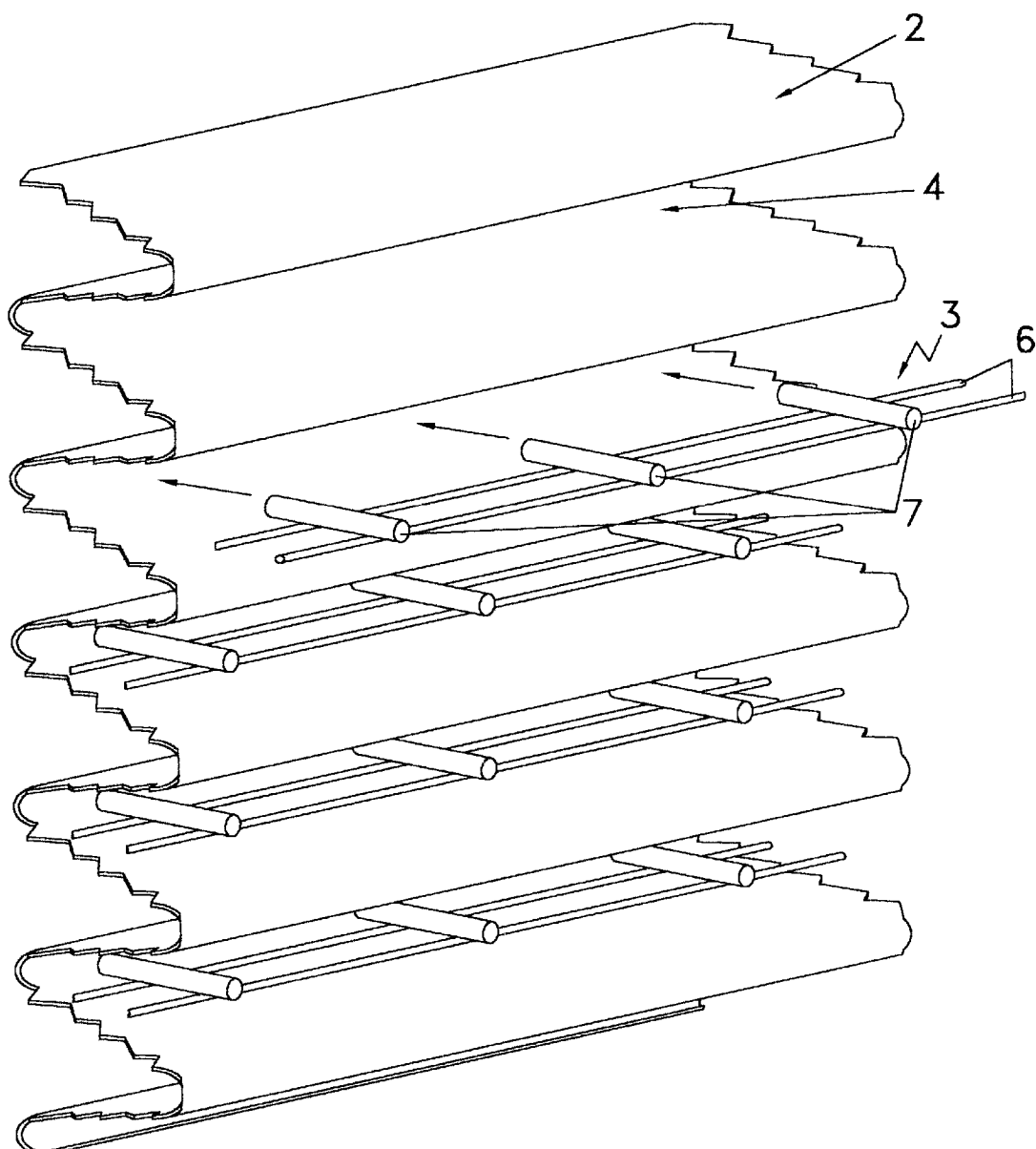
FIG. 1 is an isometric, exploded, partial view of a portion of the novel pleated filter medium with spacers disposed to be inserted between troughs formed by opposed filter medium faces of adjacent pleats.

Referring to FIG. 1 of the drawings, it can be seen that the novel pleated filter medium arrangement for removing particulate matter from a fluid stream comprises at least one sheet of pleated porous filter medium 2 which can be of a preselected width and of a suitable fibrous filtering material-such as a natural fiber, a spun or chopped glass, a synthetic polymeric fiber or a suitably preselected combination of fibers. Advantageously, the selected media is pleated into a plurality of longitudinally extending spaced pleats with valley depths in the range of one half to four inches (½"–4") with a spacing between adjacent pleat crests in the approximate range of zero point zero five to zero point five inches (0.05"–0.5").

In accordance with one feature of the present invention, individual screen-like, flow-through spacer inserts 3 of a length in the approximate range of six to seventy-two inches (6"–72") and advantageously of twenty-four inches (24") are inserted in the troughs 4 formed between opposed faces of adjacent filter medium pleats. The spacers 3 can be formed from anyone of a number of suitably selected spaced strands of synthetic material. It advantageously can be formed from strands of a suitable selectively sheathed core of extruded material having appropriate rigidity and bonding characteristics so as to provide stable pleat spacing and yet allow bondability to the media. For example, a strand composed of polypropylene core surrounded or sheathed by a polyethylene vinyl acetate or an appropriate polyethylene would serve the purpose. Further, synthetic strands coated with a suitable adhesive could be used. Spacer inserts 3 can be bonded to at least one face of each pleat so as to be in spaced relation from immediately preceding and successive crests on either side of the pleated material a distance of approximately zero point one three inches (0.13").

In accordance with still another feature of the present invention, each spacer insert 3 is composed of a set of spaced longitudinally extending thin strands 6 and a set of spaced thick strands 7 of suitably selected material. In on advantageous embodiment of the present invention, each of the larger spaced strands can have a cross-sectional diameter in the range of approximately one thirty second of an inch (1/32") to one fourth of an inch (¼") and, advantageously of approximately one twenty-fourth of an inch (1/24") and spaced from each other a distance of approximately one inch (1") with the cross-sectional diameter of each of the thin strands being approximately in the range of one-tenth (1/10) to one half (½) the diameter of the outer larger strands 7 and spaced from each other a distance of approximately zero point five (0.5").

In FIG. 1, longitudinally extending thin strands 6 extend parallel to the crests of pleated medium 2 and are fastened or bound to at least one face of the pleats with thick strands 7 which extend normally transverse strands 6 so that the pleat crests are spaced from the pleat faces to enhance fluid stream flow through filter medium 2 and to minimize the pressure drop through filter medium 2. It is to be understood that the sets 6 and 7 of spaced strands forming spacer inserts 3 can be arranged to cross and be fastened to each other at other preselected angles than as shown in the drawings in order to accomplish a desired flow-through result; however, the specific normal strand crossing arrangement as shown in FIG. 1 not only serves to enhance uniform, laminar flow through the filter pleats and minimize pressure drop but also serves to insure preselected pleat spacing to provide troughs 4 of a preselected breadth and depth. In this regard, although only two sets of spaced strands 6 and 7 are shown, it is to be understood that a third set of strands (not shown) can be provided in spaced opposed relation from the first sets of strands 6 and 7 to cross and be fastened to strand set 7 opposite the first strand set 6 and to then be fastened to the opposite face of an adjacent pleat.

Figure 2:
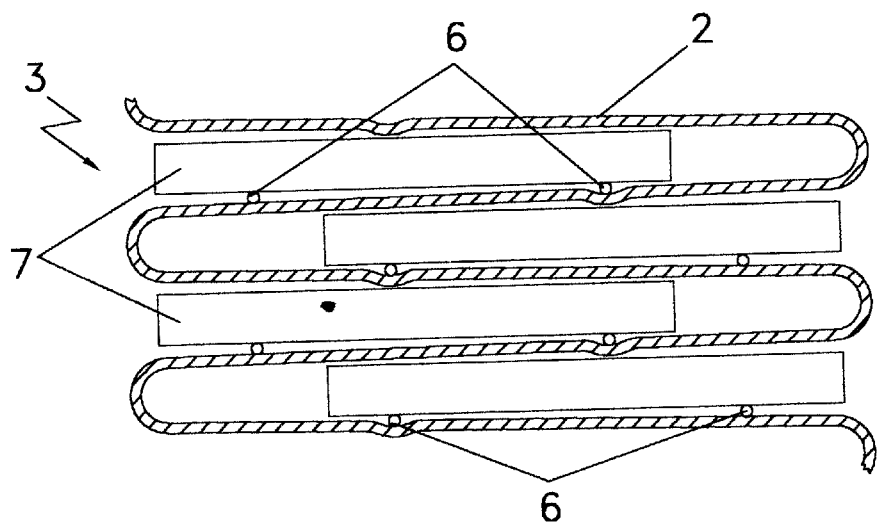
FIG. 2 is an enlarged cross-sectional, partial view of the pleated arrangement of FIG. 1, disclosing spaced, longitudinally extending spacer strands in transversely crossing relationship: the crossing strands being of differing cross-sectional thickness.
Figure 3:
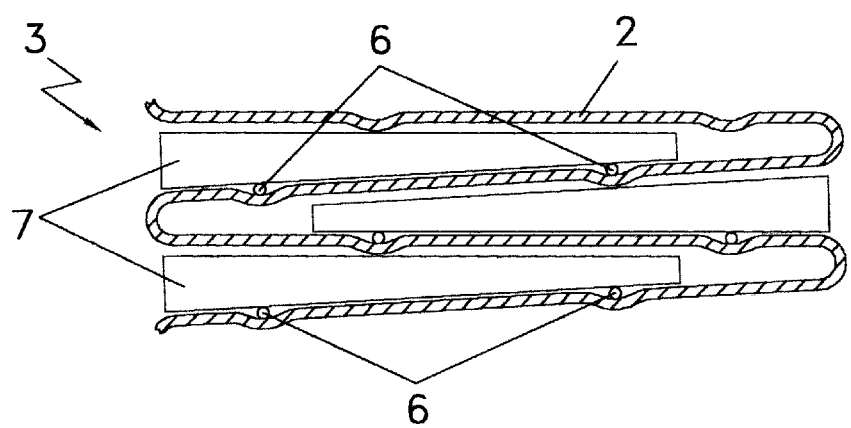
FIG. 3 is an enlarged cross-sectional partial view similar to the view of FIG. 2, disclosing spaced, longitudinally extending spacer strands in transversely crossing relationship, the crossing strands being of differing cross-sectional thickness with the set of spacer strands of larger cross-section being of longitudinally tapered configuration to enhance nesting relationship in the tapered troughs formed between opposed filter medium faces of adjacent pleats.
Figure 4:
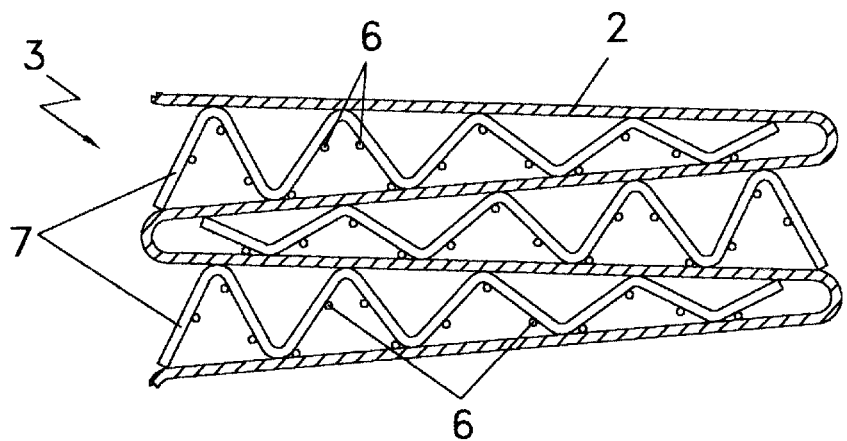
FIG. 4 is a cross-sectional, partial view of a screen-like spacer arrangement in which the spacer itself is of tapered and corrugated overall cross-sectional configuration; and, FIG. 5 is a schematic flow diagram, illustrating schematically the several steps in accomplishing the novel method of the present invention.

In FIGS. 2 and 3 of the drawings, pleat inserts 3 are shown as being comprised of only two thin and thick crossing strand sets 6 and 7, respectively, with the strands of the crossing sets abutting opposed faces of adjacent pleats of pleated filter medium 2. It is to be understood that both sets of strands can be fastened to the opposed pleat faces by a suitable adhesive or in a suitable fusing manner, as described hereinafter. Moreover, it is to be understood that only one set of strands can be fastened to an adjacent media face or each insert 3 can be arranged to "float" in the trough into which it has been inserted. Further, as can be seen in FIGS. 3 and 4 of the drawings, a longitudinally extending, tapering insert arrangement can be provided by either tapering one of the longitudinally extending strand sets in a manner as shown in FIG. 3 wherein thick strands 7 are disclosed as varying in cross-section or by corrugating and longitudinally tapering the entire insert as shown in FIG. 4.

Figure 5:
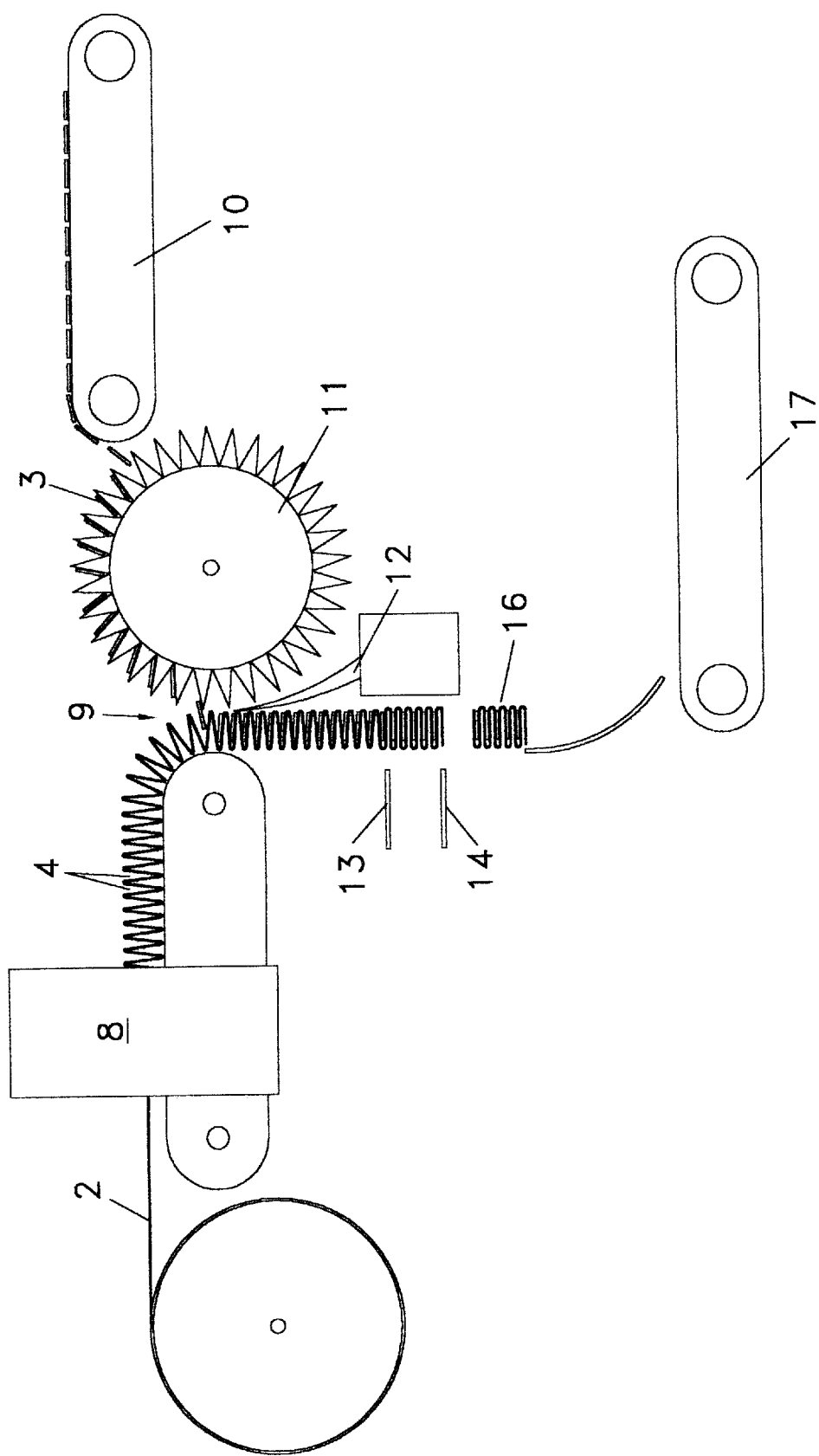

Referring to FIG. 5 of the drawings, a novel method of forming the inventive pleated filter medium is schematically disclosed. This novel and unique method includes the steps of passing a flat strip of fibrous filter medium 2 of a preselected width or breadth into pleating zone 8 to pleat the fibrous filter medium 2 into adjacent pleats having opposed faces, the pleats being of preselected depth with troughs 4 therebetween. It is to be understood that any one of several filter medium pleating machines known in the filter machine art can be utilized to accomplish the medium pleating, including opposed reciprocally engaging dies or spaced meshing teeth of adjacent meshing rollers, as is known in the pleating art. The pleats are then passed from the pleating zone 8 into a spacer insert zone 9 where a suitable spacer carrier, here shown as an endless belt (10) and peripherally recessed roller 11 inserts spacer inserts 3, which spacer inserts can be of an inventive arrangement as above described to include transversely crossing sets of spaced thin and thick strands 6 and 7, respectively. Each spacer unit 3 is inserted from its roller recess into a pleat trough 4 and, assuming that at least one or both the filter medium 2 and spacer units 3 are of meltable material, a hot gas such as air is applied to each spacer unit 3 by an ejector 12, during or immediately after it is inserted into its respective trough 4. Advantageously, the spacer inserts can be so inserted in the troughs to be in spaced relation from an immediately adjacent crest in one embodiment of the invention. With the described arrangement and depending upon the applied area of fusion, each spacer insert 3 adheres to either or both opposed faces of adjacent filter medium pleats forming the troughs 4. A reciprocating compression arm 13 is suitably positioned downstream of the spacer insert zone 9 to be reciprocally inserted into the path of the spacer loaded filter medium, serving to allow the pleats to compress and the melt to set and fasten against opposed pleat faces. By compressing the pleats, the number of pleats per unit area are optimized so as to maximize filter area with the distance between opposed faces of the pleats being sufficient to allow ready nesting and engagement of the spacer inserts between adjacent pleats. It is to be understood that instead of a hot gas melt to fasten the spacer inserts to the pleat faces, any one of a number of suitable adhesive materials can be appropriately applied to the spacer inserts 3 to selectively fasten them in their respective pleat troughs or, if desired, the spacer inserts can be free of adhesion and allowed to "float" in the pleat troughs.

After spacer insertion and compression (if elected), the spacer loaded pleated filter medium strip passes to a unit severing zone 14, which can be either a mechanical or laser shear, as is known in the art, where filter units 16 are severed to a preselected length and carried by endless conveyor 17 for suitable unit framing, as the case might be.

The invention claimed is:

1. A method of forming a pleated filter comprising: passing a flat strip of filter medium of preselected width into a pleating zone to pleat the filter medium into adjacent pleats having opposed faces of preselected depth with troughs therebetween; passing said pleated filter medium from said pleating zone into a spacer insert zone to insert an individual and separate selected spacer member have a longitudinally extending screen-forming body portion with selectively spaced, crossing strand sets, each set including a plurality of like strands, into each of said troughs to extend longitudinally along the length of each of said troughs with the selectively spaced crossing strand of one set having differing preselected cross-sections from the other set and positioned between opposed filter medium faces of adjacent pleats to provide sufficient thickness and flow-through openings to separate said adjacent pleats and maximize fluid flow through said pleats by insuring the spacing between adjacent pleats and insuring fluid flow through said crossing strand sets; and, passing said spacer inserted pleated filter medium from said spacer insert zone to a severing zone to separate said spacer inserted pleated filter medium into preselected lengths of spacer inserted pleated filter medium units.

2. The method of claim 1, wherein each spacer member is subjected to an adhering treatment prior to insertion into a pleat trough in said spacer insert zone so as to adhere to at least one face of said pleated filter medium forming said trough.

3. The method of claim 2, wherein each spacer member is of meltable material and said adhering treatment includes applying heat to at least one face of said spacer member to form a bondable state on said spacer face during insertion into said filter medium trough.

4. The method of claim 3, wherein said heat is applied in the form of a hot gas ejection.

5. The method of claim 3, wherein heat is applied to opposed faces of said spacer members and said pleats are compressed after leaving said spacer insertion zone so that said spacers adhere to opposed trough forming filter medium faces.

6. A method of forming a pleated filter comprising: passing a flat strip of fibrous filter medium of a preselected width into a pleating zone to pleat the fibrous filter medium into adjacent pleats having opposed faces of preselected depth with tapered troughs therebetween; passing said pleated filter medium from said pleating zone into a spacer insert zone to insert an individual and separate heat responsive synthetic screen-forming spacer insert corrugated in cross-section to be of varying cross-sectional tapered form to conformably engage in snug relation with each of said tapered troughs, said inserts having a longitudinally extending body portion and including selectively spaced, crossing strand sets, said sets with respect to each other being of differing cross-sectional thickness with each set including a plurality of like strands and with the spaced strand set of thinner cross-section extending substantially parallel the crests of said pleats and abutting opposed faces of adjacent pleats to fully separate said adjacent pleats applying a hot air to said spacer members so that said thinner strand set thereof bonds to the faces of said pleats; and, passing said spacer bonded pleated filter medium from said spacer insert zone to a severing zone to separate spacer bonded pleated filter medium into preselected lengths of filter units.

* * * * *